March 2, 1971   J. C. FOX ET AL   3,567,303
SELF-LOCKING HANDLE
Filed Jan. 21, 1967

INVENTORS.
WILLIAM B. STUHLER
JOSEPH C. FOX
BY Henry K. Woodward
ATTORNEY

United States Patent Office 3,567,303
Patented Mar. 2, 1971

3,567,303
SELF-LOCKING HANDLE
Joseph C. Fox, Richardson, and William B. Stuhler, Garland, Tex., assignors to Collins Radio Company, Dallas, Tex.
Filed Jan. 21, 1969, Ser. No. 792,592
Int. Cl. A47b 95/02
U.S. Cl. 312—320                                                3 Claims

ABSTRACT OF THE DISCLOSURE

A flexible self-locking handle for mounting panels or the like to a rack assembly. The handle end portions include means for lockably engaging said rack. By flexing said handle, the end portions are translated inwardly thereby releasing the rack assembly.

---

This invention relates in general to a self-locking handle and in a particular application thereof to the combination of a self-locking handle, electronic module, and a module receiving rack.

An object of the invention is a module having a flexible handle for inserting, locking, and removing the module from a mounting rack.

Another object of the present invention is a unique combination of electronic module and mounting rack including a flexible handle which facilitates easy access to the electronic rack.

Still another object of the invention is a flexible, self-locking handle for mounting plates and the like.

Briefly, in accordance with the present invention, an electronic module panel or the like is provided with a flexible handle including means for engaging a rack or like mounting structure. The handle is so designed that when the center portion thereof is flexed, the rack engaging end portion moves linearly with respect to the plate or cover thus disengaging from the mounting structure.

The invention and objects thereof will be more fully understood from the following detailed description when taken with the drawing, in which.

Figure 1:
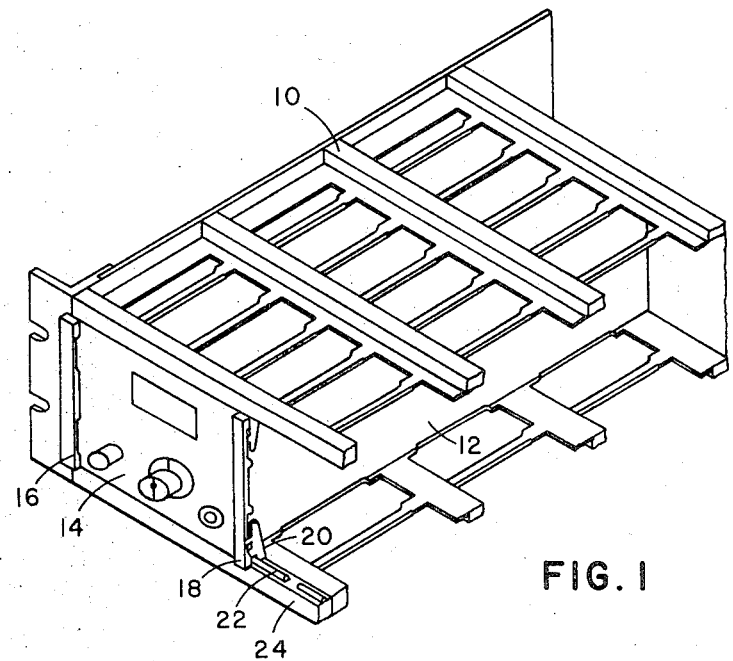
FIG. 1 is a perspective view of a portion of a mounting rack and a module including a cover provided with a flexible handle.

Referring now to the drawing, a portion of a mounting rack 10 is shown in perspective with a module 12 slideably inserted therein. Module cover 14 is provided with handles 16 and 18 at either end thereof which facilitate insertion and extraction of the module into and out of rack 10. As seen with reference to handle 18, the handle end portions include a locking lip 20 which releasably engage a rib 22 on rack member 24 when module 14 is fully inserted into rack 10.

Figures 2, 3, 4:
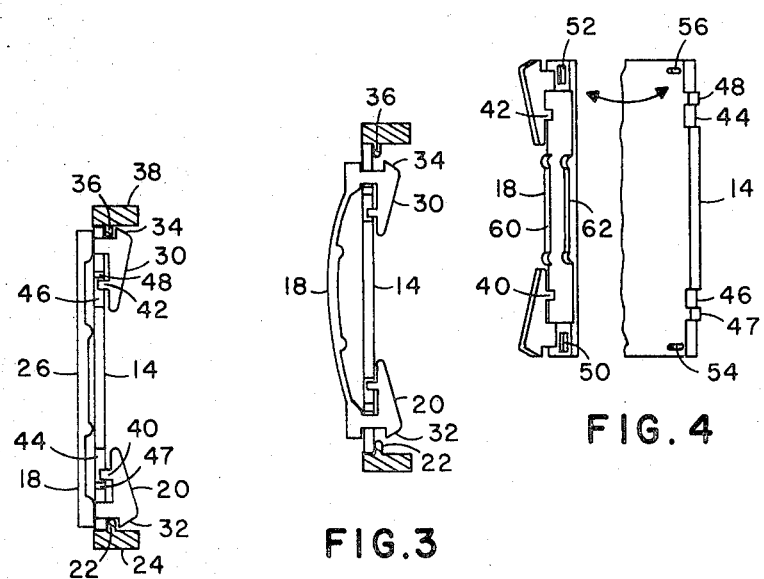
FIG. 2 is an edge view of the cover of FIG. 1 and a side view of the flexible handle in engagement with the rack.
FIG. 3 is a side view of the handle and end cover of FIG. 1 with the handle flexed to disengage the rack.
FIG. 4 is a perspecteive view of the handle and edge portion of the cover illustrating a preferred means for assembling the handle and cover.

The operation of handle 18 will be described with reference to the side views thereof in FIG. 2 and FIG. 3. Referring to FIG. 2 handle 18 includes a flexible center portion 26 and end portions 20 and 30 including locking lips 32 and 34 which engage ribs 22 and 36 of rack members 24 and 38, respectively. It will be noted that the leading edges of locking lips 32 and 34 are provided with cam surfaces to facilitate engagement of the handle and rack structure as a module is inserted into the rack. End portions 20 and 30 also include projections 40 and 42 which are positioned in slots 44 and 46 in module cover 14. While two such projections are illustrated and preferred, only one such projection is necessary. Complementary projections 47 and 48 maintain proper alignment of handle 18 on cover 14 when the handle is in a locked position and slots 44 and 46 allow the handle end portions to move inwardly linearly when the handle is flexed, as described below.

To remove the module 12 from rack 10, the handles are flexed as illustrated in FIG. 3. The flexing of handle 18 causes end portions 20 and 30 to move inwardly linearly with respect to cover 14 and locking lips 32 and 34 disengage the ribs 22 and 36 on the cage frame. The module may now be removed from the rack.

FIG. 4 illustrates a preferred means for mounting the flexible handles on the module cover and allow the linear motion of the handle end portions with respect to the plate as the module is flexed. In this view handle 18 has been rotated approximately 180° with respect to its normal position on the edge of plate 14. The handle end portions are provided with slots 50 and 52 which are offset on the end portions to accommodate pins 54 and 56 on the cover. Slots 44 and 46 are defined in the cover edge portion to accommodate the fingers 40 and 42 on the end portions of handle 18. This particular design of handle and cover allows the handle to be easily snapped into place on the cover. Ribs 60 and 62 are provided on the center portion of handle 18 to increase handle rigidity.

It is seen that the present invention provides a self-locking handle for an electronic module cover or the like for locking the module in a rack structure. The handle is easily disengaged from the rack by flexing the handle which allows the locking end portions to move linearly out of engagement with the rack. Although the invention has been described with respect to a particular embodiment, various modifications and changes may occur to those skilled in the art without departing from the spirit and scope of the invention as defined by the appended claims.

What is claimed is:

1. In combination with a panel and rack assembly, a handle for facilitating the positioning of said panel on said rack comprising a flexible center portion and a pair of end portions, at least one end portion having a locking lip for engaging said rack when said handle is unflexed, and means for connecting said handle to the edge of said panel and permitting linear travel of said end portions with respect to said edge as said handle is fixed thereby disengaging said locking lip from said rack, said means for connecting including slots in said end portions of said handle which receive pins projecting from said panel, a projection on at least one of said end portions, and a slot in said edge of said panel for receiving said projection.

2. The combination of a rack, a module, and a handle for facilitating the positioning of said module in said rack, said handle including a flexible center portion and a pair of end portions, at least one of said end portions including a locking lip for engaging said rack, and means for connecting said handle to a front edge of said module and permitting linear travel of said end portions of said handle with respect to said front edge of said module as said handle is flexed thereby disengaging said locking lip, said means for connecting including slots in said end portions of said handle which receive pins projecting from said module, a projection on at least one of said end portions, and a slot in said edge of said module for receiving said projection.

3. A self-locking flexible handle for locking a panel on a support structure, said handle including a flexible center portion and a pair of end portions, each of said end portions including a lip for engaging said support structure, and means for connecting said handle on said panel so that said end portions move linearly inwardly with respect to said panel as said handle is flexed, said means for connecting including first and second slots on said end portions, first and second pins on said panel for engaging said first and second slots, respectively, first and second projections on said end portions, and third and fourth slots in said panel for receiving said first and second projections.

References Cited

UNITED STATES PATENTS

| | | | |
|---|---|---|---|
| 3,245,546 | 4/1966 | Stuhler | 211—41 |
| 3,447,194 | 6/1969 | Bush | 16—115 |

ROY D. FRAZIER, Primary Examiner

U.S. Cl. X.R.

292—16, 38